US009044953B2

(12) United States Patent
Gila et al.

(10) Patent No.: US 9,044,953 B2

(45) Date of Patent: Jun. 2, 2015

(54) HARD IMAGING DEVICES, PRINT DEVICES, AND HARD IMAGING METHODS

(75) Inventors: Omer Gila, Cupertino, CA (US); Napoleon J. Leoni, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1020 days.

(21) Appl. No.: 12/549,777

(22) Filed: Aug. 28, 2009

(65) Prior Publication Data

US 2011/0051153 A1 Mar. 3, 2011

(51) Int. Cl.
*H04N 1/60* (2006.01)
*B41J 2/17* (2006.01)

(52) U.S. Cl.
CPC .............. *B41J 2/1714* (2013.01); *B41J 2/1721* (2013.01); *B41J 2002/1742* (2013.01)

(58) Field of Classification Search
USPC ...................................................... 347/1-101
See application file for complete search history.

(56) References Cited

U.S. PATENT DOCUMENTS

| | | | | |
|---|---|---|---|---|
| 7,318,638 B2 | 1/2008 | Shimizu et al. | | |
| 7,490,923 B2 | 2/2009 | Shibuya et al. | | |
| 7,491,911 B2 | 2/2009 | North et al. | | |
| 2003/0007026 A1* | 1/2003 | Matsumoto et al. | ............ | 347/19 |
| 2004/0160475 A1* | 8/2004 | Satoh et al. | ...................... | 347/36 |
| 2005/0052490 A1* | 3/2005 | Shimizu et al. | ................. | 347/30 |
| 2006/0164467 A1* | 7/2006 | Shibuya et al. | ................. | 347/70 |
| 2009/0060869 A1 | 3/2009 | Sugita et al. | | |
| 2009/0195605 A1* | 8/2009 | Yanata et al. | .................. | 347/47 |

OTHER PUBLICATIONS

PCT/US09/39150, Apr. 1, 2009, HP Development Company.

IBM et al., "Repelling Undesired Ink Drops," IBM Technical Disclosure Bulletin, Jul. 1, 1976, 3 pages.

* cited by examiner

*Primary Examiner* — Marcellus Augustin

(74) *Attorney, Agent, or Firm* — James D Shaurette

(57) ABSTRACT

Hard imaging devices, print devices, and hard imaging methods are described. According to one arrangement, a hard imaging device includes a media transport system configured to move media along a media path and a print device adjacent to the media path. The print device may include an image forming device configured to eject a plurality of droplets of a liquid marking agent in a direction towards the media moving along the media path to form hard images using the media, wherein the ejection of the droplets of the liquid marking agent from the image forming device creates puddles of the liquid marking agent on the image forming device and a puddle removal system configured to remove the puddles of the liquid marking agent from the image forming device.

21 Claims, 8 Drawing Sheets

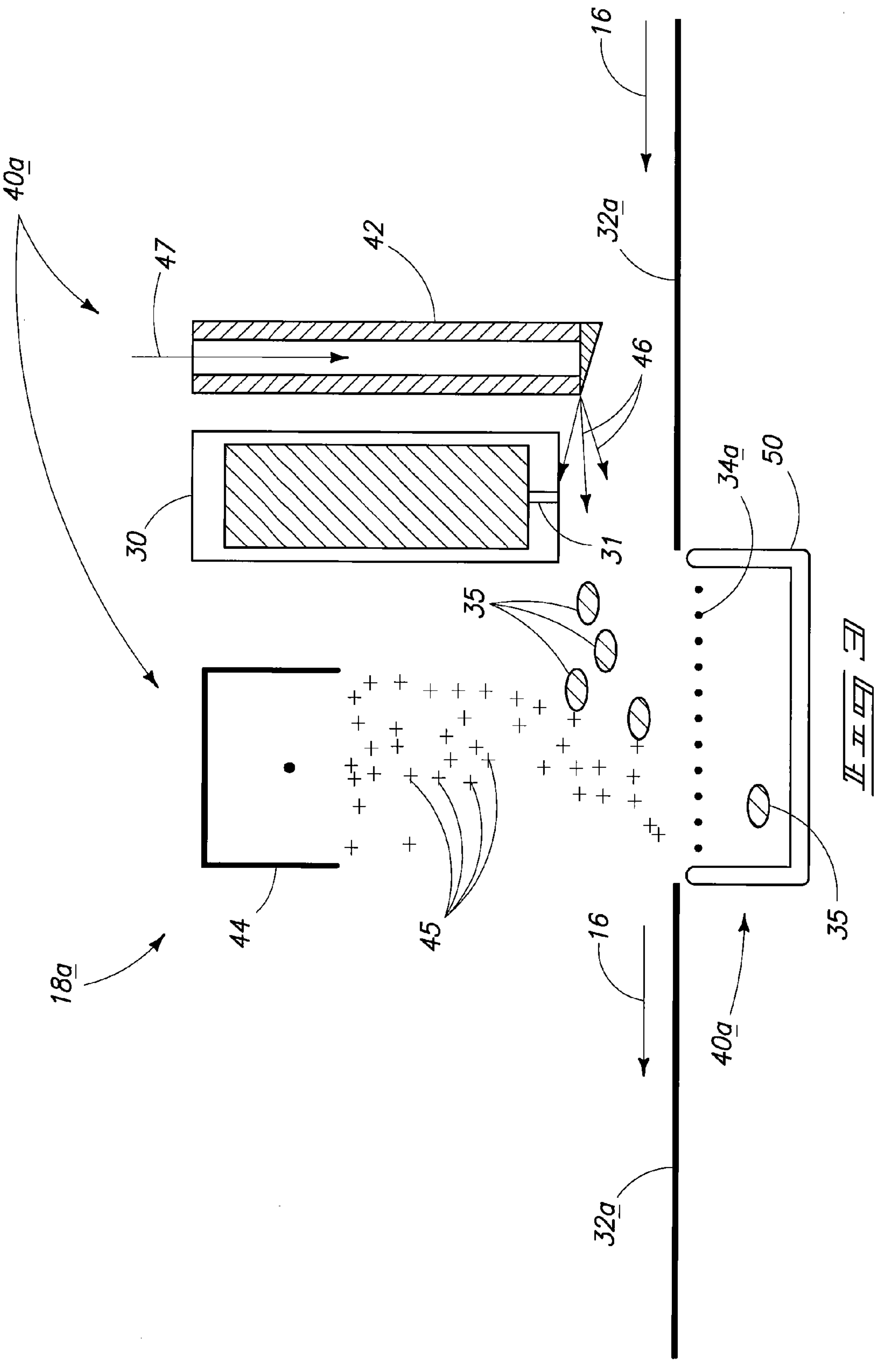
40a
47
42
16
32a
46
30
31
34a
50
35
45
44
18a

HARD IMAGING DEVICES, PRINT DEVICES, AND HARD IMAGING METHODS

BACKGROUND

Imaging devices capable of printing images upon paper and other media are ubiquitous and used in many applications including monochrome and color applications. The use and popularity of these devices continues to increase as consumers at the office and home have increased their reliance upon electronic and digital devices, such as computers, digital cameras, telecommunications equipment, etc.

A variety of methods of forming hard images upon media exist and are used in various applications and environments, such as home, the workplace and commercial printing establishments. Some examples of devices capable of providing different types of printing include laser printers, impact printers, inkjet printers, commercial digital presses, etc.

Print heads of some configurations of printers which use liquid marking agents may be subjected to contamination during printing operations. For example, in some inkjet configurations, the jetting of drops of a liquid marking agent may result in the formation of puddles of the liquid marking agent upon the nozzles which may result in degraded print quality and contamination of media being imaged upon. For example, the presence of puddles may reduce droplet speed and/or alter the direction of the droplets.

DESCRIPTION OF DRAWINGS

At least some aspects of the disclosure are directed towards improved imaging methods and apparatus.

FIG. 3 is an illustrative representation depicting removal of a puddle of a marking agent formed upon an image forming device according to one embodiment.

DETAILED DESCRIPTION

Some configurations of hard imaging devices utilize a liquid marking agent to form hard images upon media. Components of these hard imaging devices may be subjected to the development of puddles during imaging operations. For example, some printer inkjet configurations eject droplets of the liquid marking agent (e.g., ink) to form the hard images which may result in the creation of puddles of the liquid marking agent which may adversely affect printing operations. At least some aspects of the disclosure are directed towards methods and apparatus configured to remove puddles of the liquid marking agent.

Figure 1:
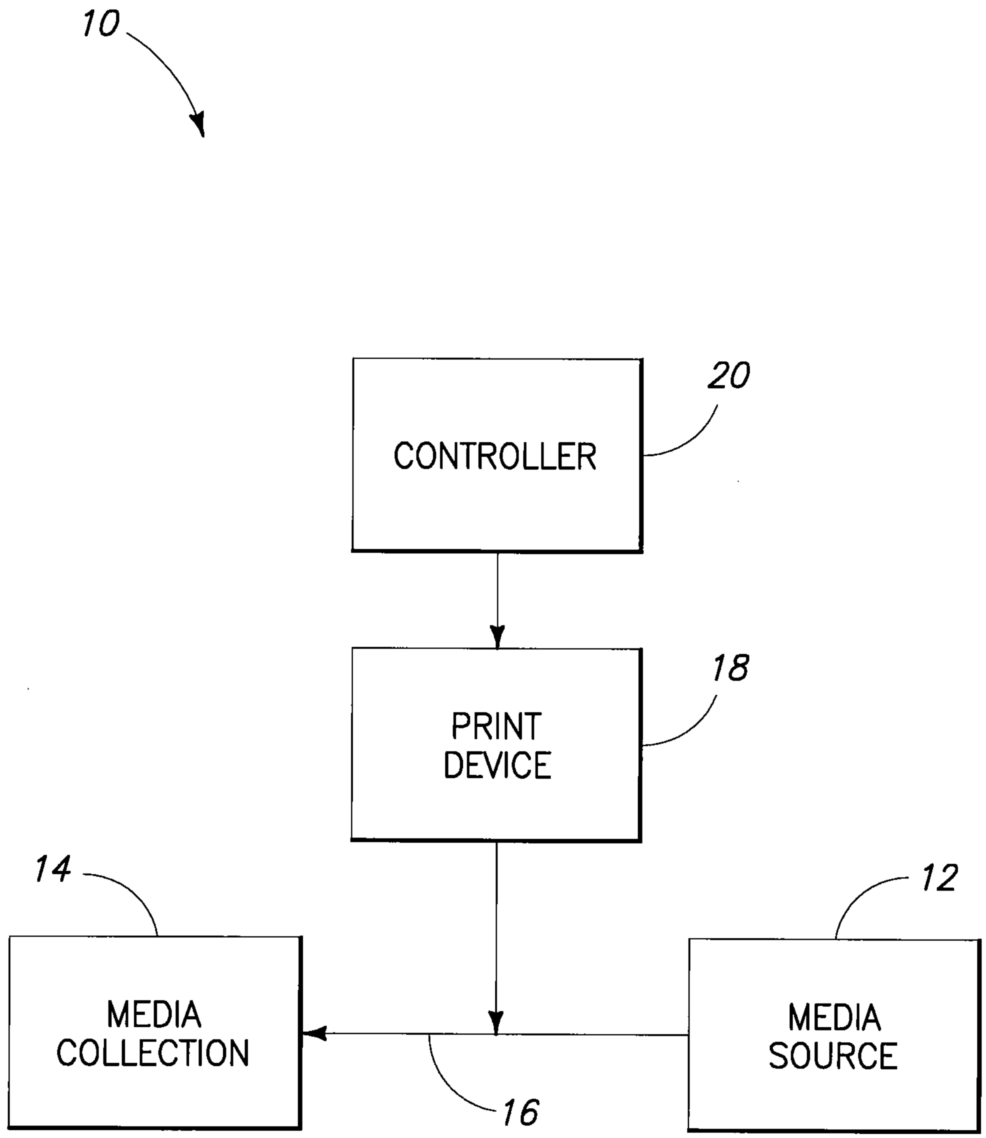
FIG. 1 is a functional block diagram of a hard imaging device according to one embodiment.

Referring to FIG. 1, an example of a hard imaging device 10 arranged according to one embodiment of the disclosure is shown. Hard imaging device 10 is configured to form hard images upon media. Example embodiments of the hard imaging device 10 include printers although other hard imaging device configurations are possible including copiers, multiple-function devices, or other arrangements configured to form hard images upon media such as paper.

The depicted embodiment of hard imaging device 10 includes a media source 12, a media collection 14, a media path 16, a print device 18 and a controller 20. Other embodiments of hard imaging device 10 are possible and include more, less or additional components.

In one embodiment, media source 12 comprises a supply of media to be used to form hard images. For example, media source 12 may be configured as a roll of web media or a tray of sheet media, such as paper. Other media or configurations of media source 12 may be used in other embodiments.

Media travels in a process direction along the media path 16 from media source 12 to media collection 14 in example embodiments. Hard images are formed using the media travelling along the media path 16 intermediate the media source 12 and media collection 14 in example configurations described below.

Media collection 14 is configured to receive the media having hard images formed thereon following printing. Media collection 14 may be configured as a take-up reel to receive web media or a tray to receive sheet media in example embodiments.

Media source 12 and media collection 14 may form a media transport system in one embodiment of hard imaging device 10 (e.g., comprising supply and take-up reels for web media) configured to move the media along the media path 16. In another embodiment of hard imaging device 10 (e.g., sheet-fed press), the media transport system may comprise a plurality of rollers or belts (not shown) to move media from media source 12 to media collection 14. Other arrangements are possible in other embodiments.

Print device 18 is configured to provide one or more liquid marking agents to media travelling along media path 16 to form the hard images in one embodiment. In one embodiment, the liquid marking agents may include one or more colors of inks to be used to form monochrome or color images. Different types of inks, such as aqueous, solvent or oil based, may be used depending upon the configuration of the hard imaging device 10. Furthermore, the liquid marking agents may include a fixer or binder, such as a polymer, to assist with binding inks to the media and reducing penetration of the inks into the media.

In one embodiment, print device 18 is an inkjet print head (e.g., piezo, thermal, etc.) configured to eject a plurality of droplets of the liquid marking agent corresponding to an image to be formed. Hard imaging device 10 may be configured to generate color hard images in one embodiment, and print device 18 may include a plurality of image forming devices, such as pens (not shown in FIG. 1), configured to provide droplets of the liquid marking agent having different colors (e.g., different colored inks) and fixers or binders (if utilized). Other arrangements of print device 18 are possible.

In one embodiment, controller 20 is arranged to process data (e.g., access and process digital image data corresponding to a color image to be hard imaged upon media), control data access and storage, issue commands, monitor imaging operations and control imaging operations of hard imaging device 10. In one embodiment, controller 20 is arranged to control operations described herein with respect to removal of puddles of the liquid marking agent generated during imaging operations.

In one arrangement, the controller 20 comprises circuitry configured to implement desired programming provided by appropriate media in at least one embodiment. For example, controller 20 may be implemented as one or more of a processor and/or other structure configured to execute executable instructions including, for example, software and/or firmware instructions, and/or hardware circuitry. Example embodiments of controller 20 include hardware logic, PGA, FPGA, ASIC, state machines, and/or other structures alone or in combination with a processor. These examples of controller 20 are for illustration and other configurations are possible.

Figure 2:
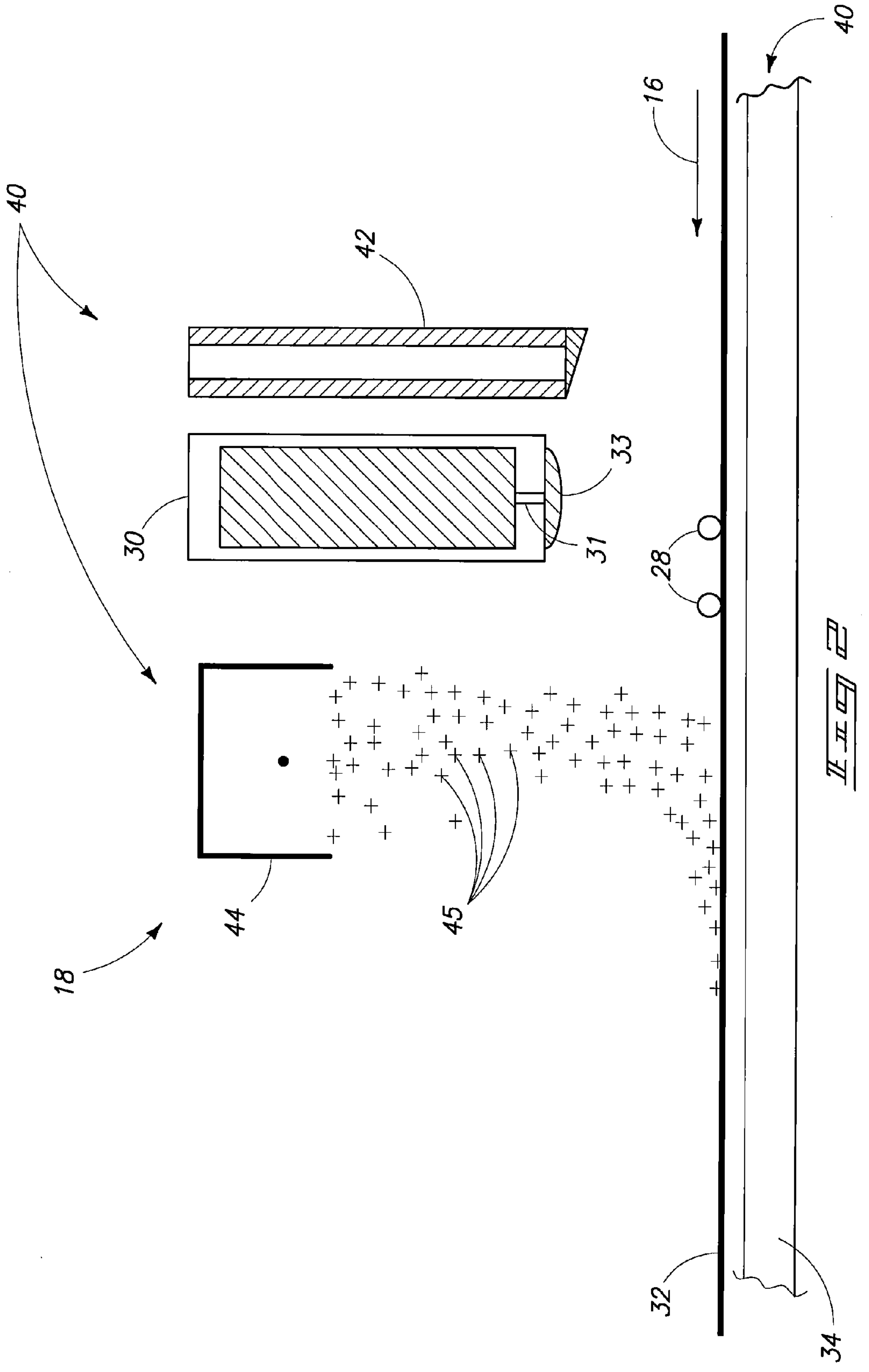
FIG. 2 is an illustrative representation depicting a puddle of a marking agent formed upon an image forming device according to one embodiment.

Referring to FIG. 2, one embodiment of print device 18 configured as an inkjet print head and arranged to form color hard images is shown. The print device 18 is configured to form hard images upon media 32 travelling along media path 16 as shown.

Print device 18 includes an image forming device 30 configured to form hard color images. In one embodiment, the image forming device 30 is configured to eject droplets of a liquid marking agent to form hard images in one embodiment. Additional image forming devices 30 may be provided in other embodiments of the print device 18, for example, to eject different colors of liquid marking agents. Plural image forming devices 30 (if provided) may be arranged in series along the media path 16 in one embodiment.

Image forming device 30 includes a nozzle 31 at a surface adjacent to media path 16 in one embodiment. Nozzle 31 may be spaced from the media 32 approximately 0.5-1.0 mm in one embodiment. Image forming device 30 is configured to eject droplets 28 of the liquid marking agent from nozzle 31 toward media 32 moving along media path 16. The ejection of droplets 28 by image forming device 30 forms hard images upon media 32 while also resulting in the formation of a puddle 33 of the liquid marking agent on a lower surface of the image forming device 30. The ejection of droplets 28 may also result in the formation of aerosol satellites of the liquid marking agent (not shown). One configuration of hard imaging device 10 for reducing the presence of satellites is described in a co-pending PCT patent application having serial number PCT/US2009/39150, entitled "Hard imaging devices and hard imaging methods," filed Apr. 1, 2009, naming Omer Gila et al. as inventors, assigned to the assignee hereof.

Droplets 28 may individually have an elongated shape as they are ejected from nozzles 31 due to surface tension forces between the ejected liquid marking agent and the nozzle 31. The heads of the droplets 28 may move at a faster rate away from image forming device 30 compared with the tail portions of the droplets 28 and some liquid marking agent of the droplets 28 may remain upon the image forming device 30 resulting in the formation of puddles 33 and other negative effects such as aerosol and mist resulting from small satellites (e.g., smaller than approximately 0.3 pL) becoming entrained in the air flow caused by media motion. The puddles 33 may degrade print quality of the print device 18 if not removed from the image forming device 30.

According to some embodiments described herein, hard imaging device 10 includes a puddle removal system 40 configured to remove puddles 33 which form upon image forming device 30 during imaging operations. Referring to the example arrangement shown in FIG. 2, the puddle removal system 40 includes an air supply 42, a source 44 and a target 34.

Figure 2A:
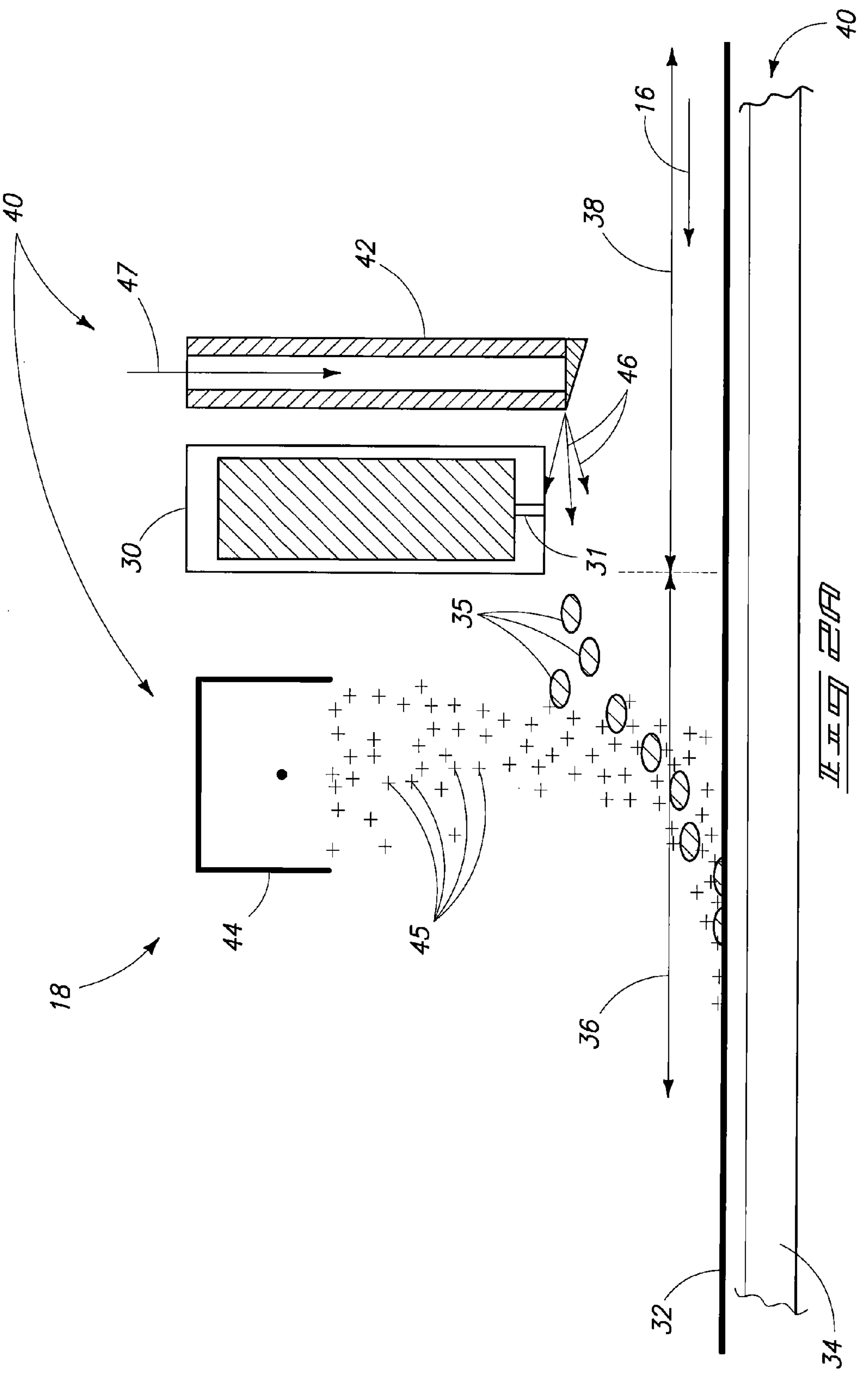
FIG. 2A is an illustrative representation depicting removal of the puddle shown in FIG. 2 according to one embodiment.

Referring to FIG. 2A, air supply 42 is configured to selectively direct streams of air 47 as bursts of air 46 laterally across the lower surface of image forming device 30 to remove puddles 33 formed thereon. As shown in FIG. 2A, the emitted bursts of air 46 create a spray including a plurality of portions 35 of the puddle 33 of the liquid marking agent. In one embodiment, air supply 42 is implemented as an air knife although other arrangements are possible, some of which are described below.

In one embodiment, controller 20 is configured to control air supply 42 to emit the bursts of air 46 at selected moments in time to reduce impacts upon printing operations. In the embodiment shown in FIGS. 2 and 2A, media 32 in the form of web media is used and includes a non-image area 36 and an image area 38. Hard images are formed upon image area 38 and are not formed upon non-image area 36. For example, non-image area 36 may be a seam region between a plurality of image areas 38 which may correspond to sheets containing hard images (e.g., after cutting of the web media 32). At least some aspects of the disclosure may be utilized to direct liquid marking agent onto a non-image area 36 having a length of approximately 1-2 mm in the process direction.

Controller 20 is configured to monitor the location of non-image areas 36 and image areas 38 of the media 32 as the media 32 moves along the media path 16. Controller 20 is configured to control the emission of bursts of air 46 at appropriate moments in time such that the portions 35 of the puddle 33 land upon non-image areas 36 of the media 32 and do not land upon the image areas 38 of the media 32. For example, controller 20 may monitor locations of non-image areas 36 and image areas 38 with respect to image forming device 30 as the media 32 moves along the media path 16 and uses the monitored locations to control the timing of the emissions of the bursts of air 46. In another example, a non-image area 36 may be a blank sheet of media 32 used to collect the liquid marking agent of the portions 35 of a puddle 33. In another example, controller 20 may emit the bursts of air 46 when the device 10 is not printing (e.g., between successive print jobs). Portions of media 32 receiving the liquid marking agent of the portions 35 of the puddles 35 may be discarded.

Source 44 is configured to electrically charge liquid marking agent of portions 35 of puddles 33 and target 34 is configured to attract the charged liquid marking agent of the portions 35. In the depicted example embodiment, source 44 may be referred to as a charge injector (e.g., corona, Scorotron, charge roller, needle, edge) and is configured as a positive charging device which emits a stream of positively charged ions 45 to provide an electrical field, charge the liquid marking agent of the portions 35 of puddle 33 and direct the charged liquid marking agent of the portions 35 of puddle 33 towards target 34.

A charge emitting portion of source 44 is provided approximately 2-6 mm above the surface of media 32 in one embodiment. The charge emitting portion of source 44 may be provided at substantially the same elevation as nozzle 31 in another embodiment (e.g., 0.5-1 mm above the surface of media 32). Source 44 is shown as an external device separate from the image forming device 30 in the depicted embodiment. In other arrangements, source 44 may be provided within a common housing (not shown) which includes the device 30 (and perhaps the air supply 42).

In the illustrated example embodiment, target 34 is implemented as a grounded structure configured to attract the emitted charged ions 45. In one embodiment, target 34 is implemented as a conductive plate adjacent to the media path 16 and media 32. In some arrangements, media 32 travelling along media path 16 is spaced from the target 34 (e.g., spaced by a distance of approximately 0.4 mm-1 mm) to avoid abrasion of media 32 and/or damage to images which may be formed on the lower surface of media 32. In another embodiment, the target 34 is implemented as a plurality of grounded conductive rollers (not shown) which contact and move media 32 travelling along the media path 16. In one more specific example, the grounded conductive rollers are positioned in alignment with the image forming device 30. Other configurations of target 34 are possible.

In the depicted embodiment, the positively charged ions 45 emitted from source 44 are attracted to target 34. While travelling along field lines intermediate the source 44 and target 34, the ions 45 positively charge the liquid marking agent of the portions 35 of puddle 33 and which is subsequently attracted to the grounded target 34. The generated electrical field directs the electrically charged liquid marking agent downward towards the target 34 to non-image areas 36 of media 32. In an illustrative example, the source 44 implemented as a positive coronas has an operational voltage of approximately 3 kV if the media 32 contacts the target 34 and approximately 5-8 kV if the media 32 is spaced approximately 0.5-1.0 mm from the target 34. Other arrangements are possible.

As discussed above in one embodiment, the source 44 is configured to emit a stream of positively-charged ions 45 which are attracted to the grounded target 34. Source 44 may be configured to emit negatively charged ions 45 and target 34 may be provided at a positive voltage to attract the negatively charged ions 45 and the liquid marking agent of the portions 35 of puddle 33 charged thereby in another embodiment.

In one embodiment using negatively charged ions 45, an ozone removal system (not shown) may be used to remove ozone generated during the emission of the negative ions 45 from source 44*a* (e.g., using suction to remove the ozone). Typical charge fluxes of source 44 implemented as negative corona provides approximately $10^{12}$ electrons per $cm^2$ of the media 32 for a typical process speed of print device 18 of approximately 1~2 m/s compared with approximately 40% of the number for positive coronas. In one arrangement, source 44 configured as a corona has a current of approximately 2 mA/meter ($10^{11}$ electrons per $cm^2$) and about 16 watts/meter of width.

The velocity of ions 45 ($2\times10^2$ m/s) emitted by source 44 is large compared with air speed corresponding to the movement of media 32 along path 16 (e.g., 1~2 m/s) and velocity of ejected droplets 28 (approximately 5-10 m/s).

The emitted bursts of air 46 may have different velocities depending upon the configuration of the hard imaging device 10. As discussed above, it is desired to control the emission of the bursts of air 46 such that the portions 35 of puddle 33 land upon non-image areas 36 of media 32. A number of factors of the design of the hard imaging device 10 may be utilized to determine the appropriate velocities of the bursts of air 46 to be used. For example, the height of the nozzle 31 from the media 32, types of nozzles 31 being used, the power of the source 34, the speed of the media 32 moving along the media path 16, the type of liquid marking agent being utilized, and the frequency of the bursts of air 46 are example design parameters which may be considered to determine the appropriate velocities of the bursts of air 46 to provide the portions 35 of the puddles 33 upon the non-image areas 36 of the media 32. In one example, bursts of air 46 having velocities within a range of approximately 1 m/s-100 m/s may be utilized.

In one embodiment, and as discussed in the co-pending application referred to above, the source 44 may be utilized to also reduce the presence of satellites of the liquid marking agent. Controller 20 may be configured in some embodiments to provide different powers to source 44 depending upon whether the source 44 is being utilized to remove satellites or portions 35 of puddles 33 during imaging operations. More specifically, controller 20 may increase the power of source 44 to remove portions 35 of puddles 33 (e.g., 10×) compared with the power of source 44 to remove satellites in one embodiment. In one embodiment, source 44 may be used to remove satellites when not being used to remove portions 35 of puddles 33.

Furthermore, the bursts of air 46 may be controlled to be emitted in relatively fast response times (e.g., a few tens of msec) to provide removal of the puddles 33 at specific moments in time to assure that the portions 35 of the puddles 33 land upon non-image areas 36 of the media 32. In one embodiment, air supply 42 may include a solenoid (not shown), which is controlled by controller 20, to provide the streams of air 47 and bursts of air 46 to remove the puddles 33 at appropriate moments in time.

In addition, the frequency of the emission of the bursts of air 46 may be varied depending upon a number of factors, such as the specific liquid marking agent and media (e.g., web or sheet) being utilized in a specific implementation as well as the type of nozzle 31. In some examples, the bursts of air 46 may be provided after defined amounts of printing. For example, the bursts of air 46 may be provided at defined intervals of seconds up to 10 minutes of printing depending upon the specific configuration of hard imaging device 10. The defined amounts of printing may be determined in other ways in other embodiments, for example, based upon a number of impressions or sheets printed.

Referring to FIG. 3, another embodiment of puddle removal system 40*a* of print device 18*a* is shown. More specifically, print device 18*a* is configured to form hard images upon sheet media 32*a* travelling along media path 16. Similar to the embodiment of FIGS. 2 and 2A, puddle removal system 40*a* includes an air supply 42 and source 44. In addition, the illustrated puddle removal system 40*a* also includes a collector 50 adjacent to target 34*a* in the form of a conductive grid. The collector 50 comprises a tub in one arrangement configured to collect the liquid marking agent of the portions 35 of puddle 33.

Two sheets of media 32*a* moving along media path 16 are shown in FIG. 3 adjacent to opposite sides of collector 50 and target 34*a*. Target 34*a* may be grounded in one embodiment where source 44 is configured to emit positively-charged ions 45. Accordingly, the positively-charged liquid marking agent of the portions 35 of puddle 33 are attracted to the target 34*a* and into collector 50 where the collected liquid marking agent may be subsequently removed. In one embodiment, controller 20 is configured to control the emission of the bursts of air 46 at appropriate moments in time such that the liquid marking agent of the portions 35 of puddle 33 is directed into the collector 50 between two adjacent sheets of the media 32*a* as shown. In another embodiment, collector 50 may be eliminated and portions 35 may be directed to a blank sheet of media to be discarded.

Figure 4:
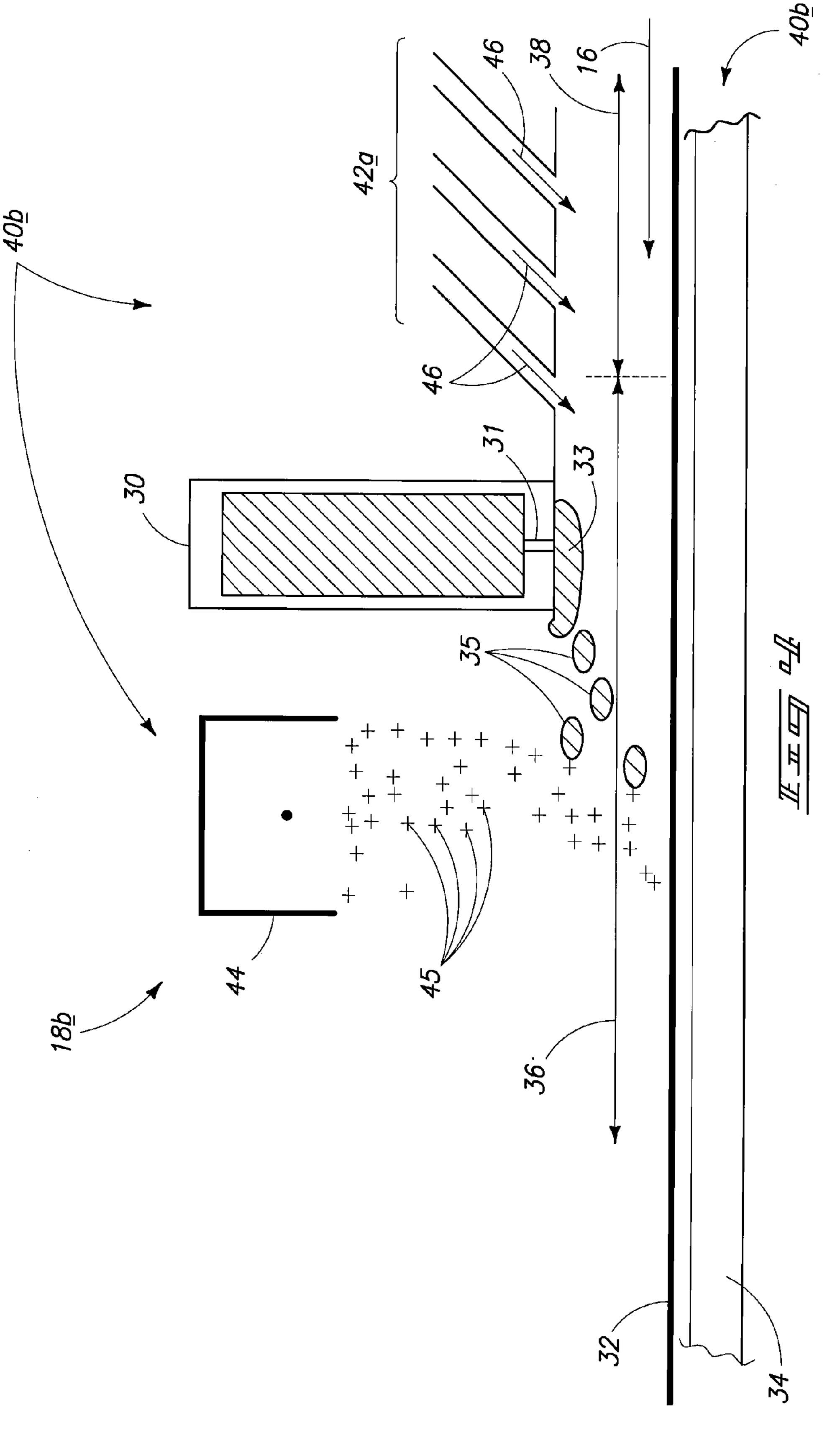
FIG. 4 is an illustrative representation depicting removal of a puddle of a marking agent formed upon an image forming device according to one embodiment.

Referring to FIG. 4, another embodiment of puddle removal system 40*b* of print device 18*b* is shown. Print device 18*b* is configured to form hard images upon either web media 32 or sheet media 32*a* travelling along media path 16 (although web media 32 is shown in FIG. 4). The illustrated puddle removal system 40*b* includes target 34, air supply 42*a* and source 44. The air supply 42*a* is implemented as a manifold configured to simultaneously emit one or more bursts of air 46 (i.e., the manifold emits three bursts of air 46 in the example configuration of FIG. 4) to remove puddles 33 from image forming device 30. The manifold may be arranged to direct the bursts of air 46 at an angle between 5 and 60 degrees in one embodiment. Controller 20 is configured to control the emission of the bursts of air 46 at appropriate moments in time such that the liquid marking agent of the portions 35 of puddle 33 is directed onto the non-image area 36 of the media 32 in one embodiment. The portions 35 are charged by the source 44 and directed towards the target 34 and media 32.

Figure 5:
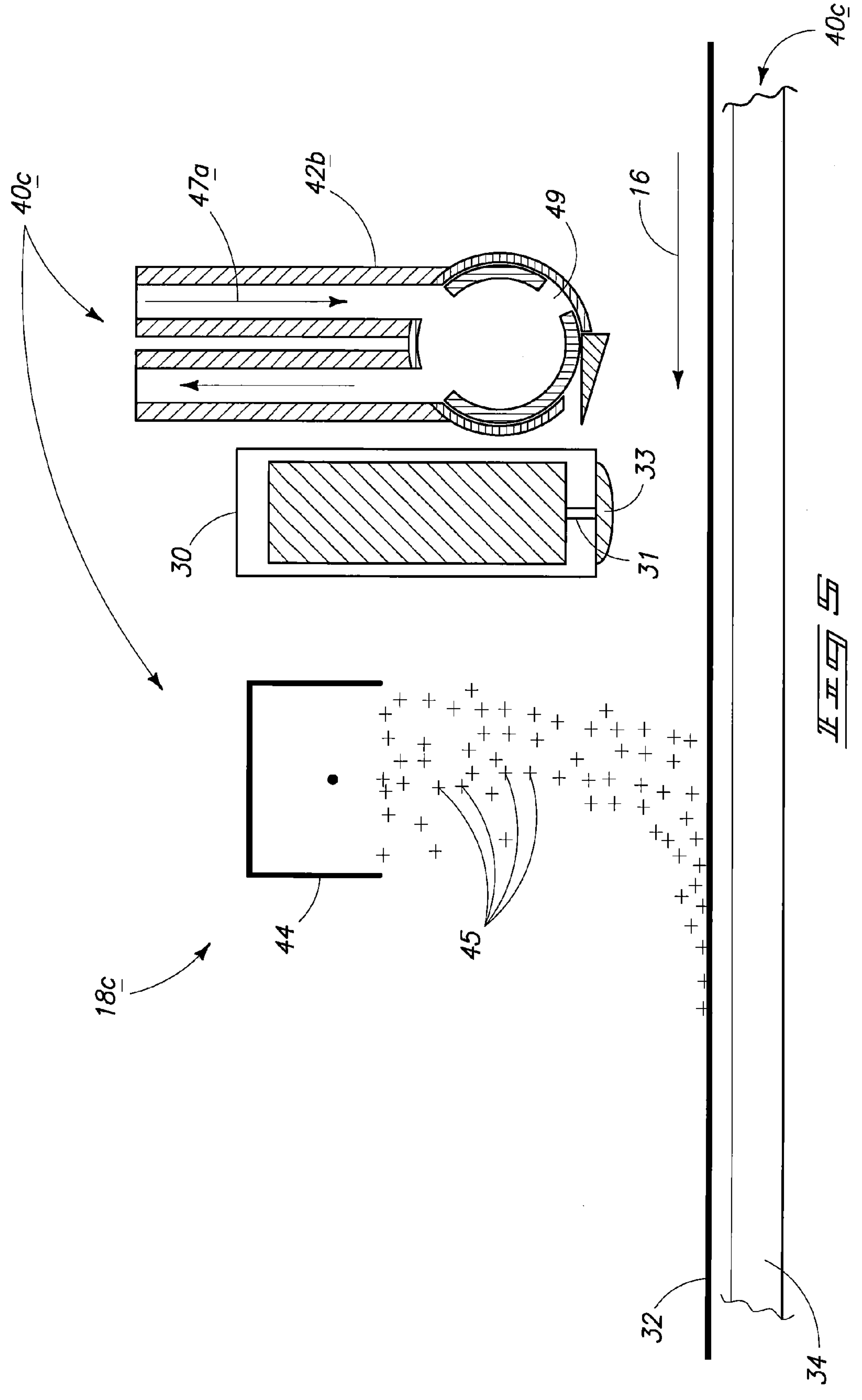
FIG. 5 is an illustrative representation depicting a puddle of a marking agent formed upon an image forming device according to one embodiment.
Figure 5A:
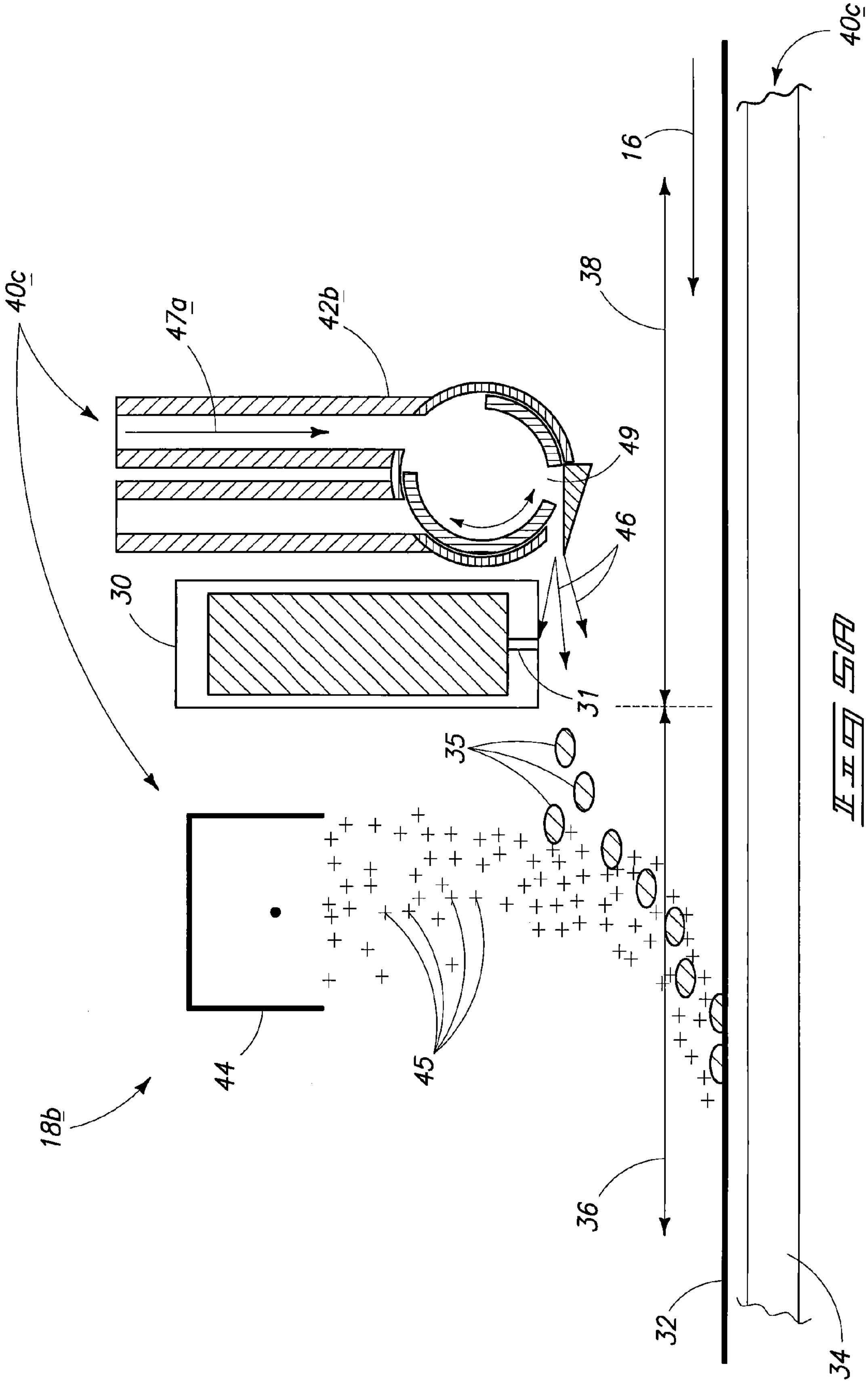
FIG. 5A is an illustrative representation depicting removal of the puddle shown in FIG. 5 according to one embodiment.

Referring to FIGS. 5 and 5A, another embodiment of puddle removal system 40*c* of print device 18*c* is shown. Print device 18*c* is configured to form hard images upon either web media 32 or sheet media 32*a* travelling along media path 16 (although web media 32 is shown in FIGS. 5 and 5A). The illustrated puddle removal system 40*c* includes an air supply 42*b* and source 44. The air supply 42*b* comprises a moveable mechanical baffle which includes an orifice 49 configured to selectively emit bursts of air 46 towards image forming device 30 at appropriate moments in time determined by controller 20.

In FIG. 5, the orifice is in a closed position and a pressurized air stream 47*b* continuously flows through air supply 42*b* but air bursts 46 are not emitted. In FIG. 5A, the controller 20 has controlled the orifice 49 to move to an open position where a burst of air 46 is emitted from air supply 42*b* to remove the puddle 33 from image forming device 30. Controller 20 is configured to control the emission of the bursts of air 46 at appropriate moments in time such that the liquid marking agent of the portions 35 of puddles 33 are directed onto the non-image area 36 of the media 32 in one embodiment. The portions 35 are charged by the source 44 and directed towards the target 40*c* and media 32.

Figure 6:
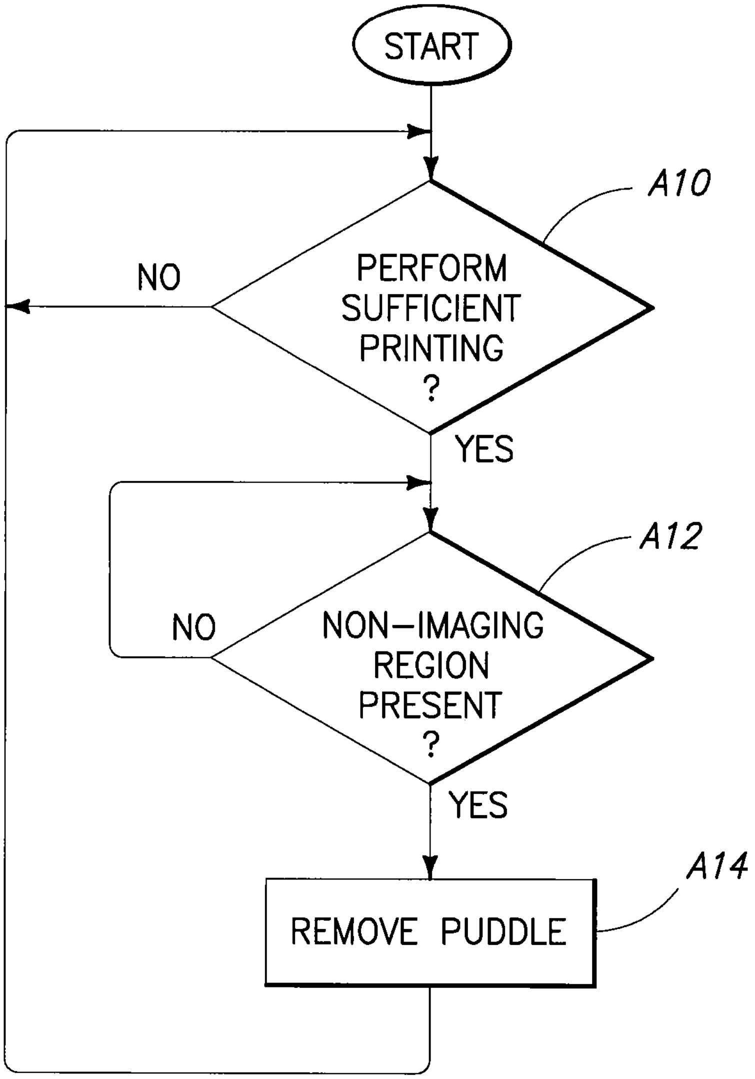
FIG. 6 is a flow chart depicting a method for removing a puddle of a marking agent from an image forming device according to one embodiment.

Referring to FIG. 6, a method of controlling the removal of puddles according to one embodiment is shown. The method may be executed by controller 20 in one embodiment. Other methods are possible including more, less and/or alternative acts.

At an act A10, the controller determines whether sufficient printing has been performed where a puddle may be present upon the image forming device. The controller may monitor a defined amount of printing (e.g., number of hard images which have been formed or an amount of time which has passed since the last puddle removal operation has been performed in example arrangements). The controller continues to monitor the printing at act A10 if the condition of act A10 is negative.

If the condition of act A10 is affirmative, the controller proceeds to an act A12 to determine if a non-image region or area is present (e.g., non-image area of web media, a space between successive sheet media or a sheet of media to be discarded) indicating an appropriate time to implement a puddle removal operation. The controller continues to monitor for the presence of a non-image region at act A12 if the condition of act A12 is negative.

If the condition of act A12 is affirmative, the controller proceeds to an act A14 to initiate a puddle removal operation including controlling the emission of a burst of air at an appropriate moment in time to direct the liquid marking agent of the puddle to a non-image area.

At least some of the arrangements described herein provide advantages over some conventional arrangements which may physically wipe accumulated puddles from pens. For example, at least some of the embodiments of the disclosure may facilitate removal of the puddles since at least some of the embodiments may be implemented during the printing of a print job without stopping the printing for wiping the pens.

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

The invention claimed is:

1. A hard imaging device, comprising:

a media transport system to move media along a media path;

an image forming device to eject a plurality of droplets of a liquid marking agent in a direction towards the media moving along the media path to form hard images using the media, wherein the ejection of the droplets of the liquid marking agent from the image forming device creates a puddle of the liquid marking agent suspended from an external surface of the image forming device;

a puddle removal system to remove the puddle of the liquid marking agent suspended from the image forming device, the image forming device and the puddle removal system located adjacent the media path, the puddle removal system, comprising:

a source to electrically charge the puddle of the liquid marking agent; and a target to attract the puddle of the liquid marking agent after the source has electrically charged the liquid marking agent, wherein the target comprises at least one of a conductive plate or a conductive grid.

2. The device of claim 1, wherein the puddle removal system is to remove the puddle after defined amounts of printing using the image forming device.

3. The device of claim 1, wherein the image forming device comprises a nozzle to eject the droplets of the liquid marking agent, and wherein the puddle removal system is to remove the puddle from the nozzle.

4. The device of claim 3, wherein the puddle removal system comprises an air supply to emit a burst of air toward the puddle to remove the puddle from the nozzle.

5. The device of claim 1, wherein the source is to electrically charge the liquid marking agent of the puddle after the removal of the puddle from the image forming device.

6. The device of claim 1, wherein the puddle removal system comprises a collector to collect the liquid marking agent of the puddle.

7. The device of claim 1, wherein the puddle removal system is to direct the liquid marking agent of the puddle to portions of the media.

8. The device of claim 7, wherein the puddle removal system is to direct the liquid marking agent of the puddle to non-image areas of the media.

9. The device of claim 1, wherein the puddle removal system comprises an air supply to emit a burst of air to remove the puddle.

10. The device of claim 9, further comprising a controller to control the emission of the burst of air.

11. The device of claim 9, wherein the air supply comprises an air knife.

12. The device of claim 9, wherein the air supply comprises a manifold.

13. The device of claim 9, wherein the air supply comprises a baffle.

14. The device of claim 1, wherein the target is oppositely charged from the puddle.

15. The device of claim 1, wherein the target comprises a grounded target.

16. A print device, comprising:

an image forming device comprising a nozzle to eject a plurality of droplets of a liquid marking agent in a direction towards media moving along a media path of a hard imaging device to form hard images using the media;

a puddle removal system to emit a burst of air adjacent to the nozzle to remove a puddle of the liquid marking agent suspended from an external surface of the image forming device, the puddle resulting from the ejection of the droplets of the liquid marking agent; and a source to electrically charge the liquid marking agent of the puddle after the removal of the puddle from the image forming device.

17. A hard imaging method, comprising:

using an image forming device, ejecting a plurality of droplets of a liquid marking agent in a direction towards a media path, the ejecting of the droplets creating a puddle of the liquid marking agent, the puddle suspended from an external surface of the image forming device;

removing the puddle of the liquid marking agent from the image forming device using a burst of air;

electrically charging the liquid marking agent of the puddle after the removing to direct the liquid marking agent of the puddle toward a target; and receiving the droplets of the liquid marking agent upon media travelling along the media path to form hard images comprising the droplets of the liquid marking agent and the media.

18. The method of claim 17, wherein the ejecting comprises ejecting using a nozzle of the image forming device, and the removing comprises removing the puddle from the nozzle.

19. The method of claim 17, wherein the removing comprises directing the liquid marking agent of the puddle to portions of the media.

20. A hard imaging method, comprising:

using an image forming device, ejecting a plurality of droplets of a liquid marking agent in a direction towards a media path, the ejecting of the droplets creating a puddle of the liquid marking agent suspending from the image forming device;

removing the puddle of the liquid marking agent from suspending from the image forming device using a burst of air;

receiving the droplets of the liquid marking agent upon media travelling along the media path to form hard images comprising the droplets of the liquid marking agent and the media; and detecting a plurality of occurrences of defined amounts of printing of the hard images using the image forming device, and wherein the removing the puddle comprises removing as a result of the detecting.

21. A hard imaging device, comprising:

a media transport system to move media along a media path;

an image forming device to eject a plurality of droplets of a liquid marking agent in a direction towards the media moving along the media path to form hard images using the media, wherein the ejection of the droplets of the liquid marking agent from the image forming device creates a puddle of the liquid marking agent from suspending from an external surface of the image forming device;

a puddle removal system to remove the puddle of the liquid marking agent from suspending from the image forming device, the image forming device and the puddle removal system located adjacent the media path, the puddle removal system, comprising:

a source to electrically charge the puddle of the liquid marking agent; and a target to attract the puddle of the liquid marking agent after the source has electrically charged the liquid marking agent, wherein the target comprises a conductive roller.

* * * * *